June 11, 1963
F. E. ADAMSON
3,093,728
ARC WELDING GUN
Filed March 17, 1961
3 Sheets-Sheet 1
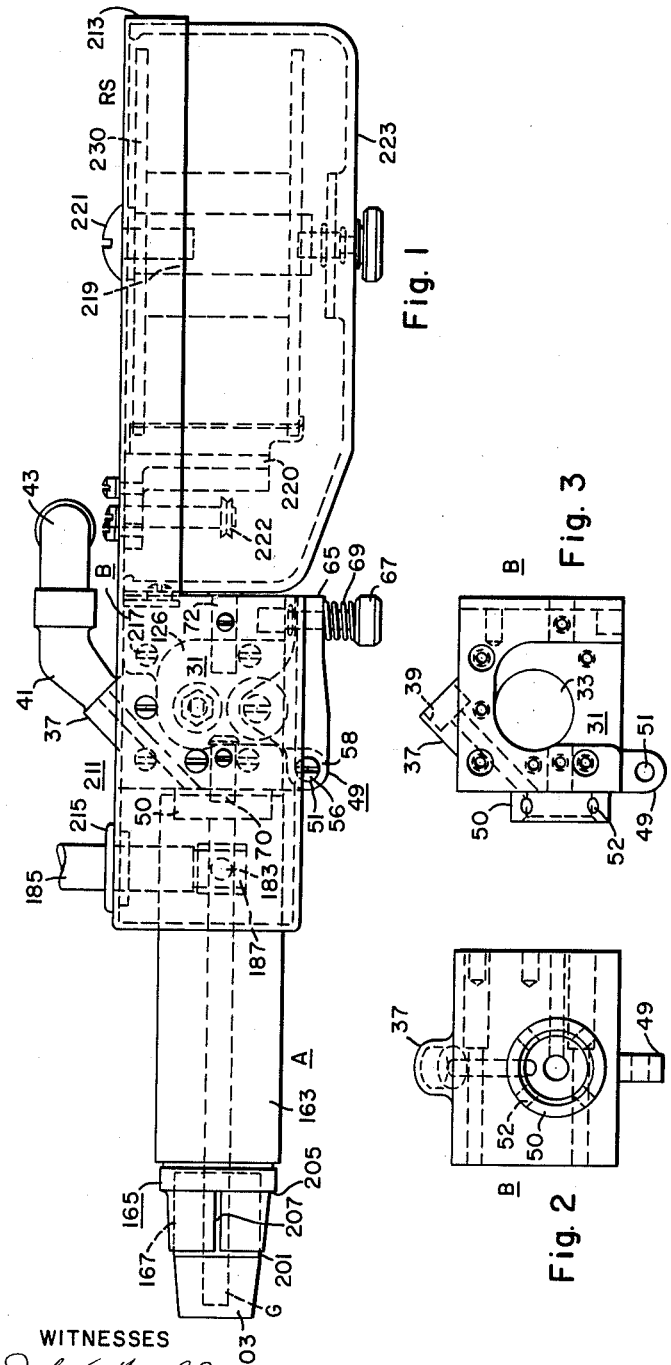
WITNESSES
John E. Healy Jr.
James F. Young
INVENTOR
Floyd E. Adamson
BY
Hymen Diamond
ATTORNEY June 11, 1963 F. E. ADAMSON 3,093,728
ARC WELDING GUN
Filed March 17, 1961 3 Sheets-Sheet 2
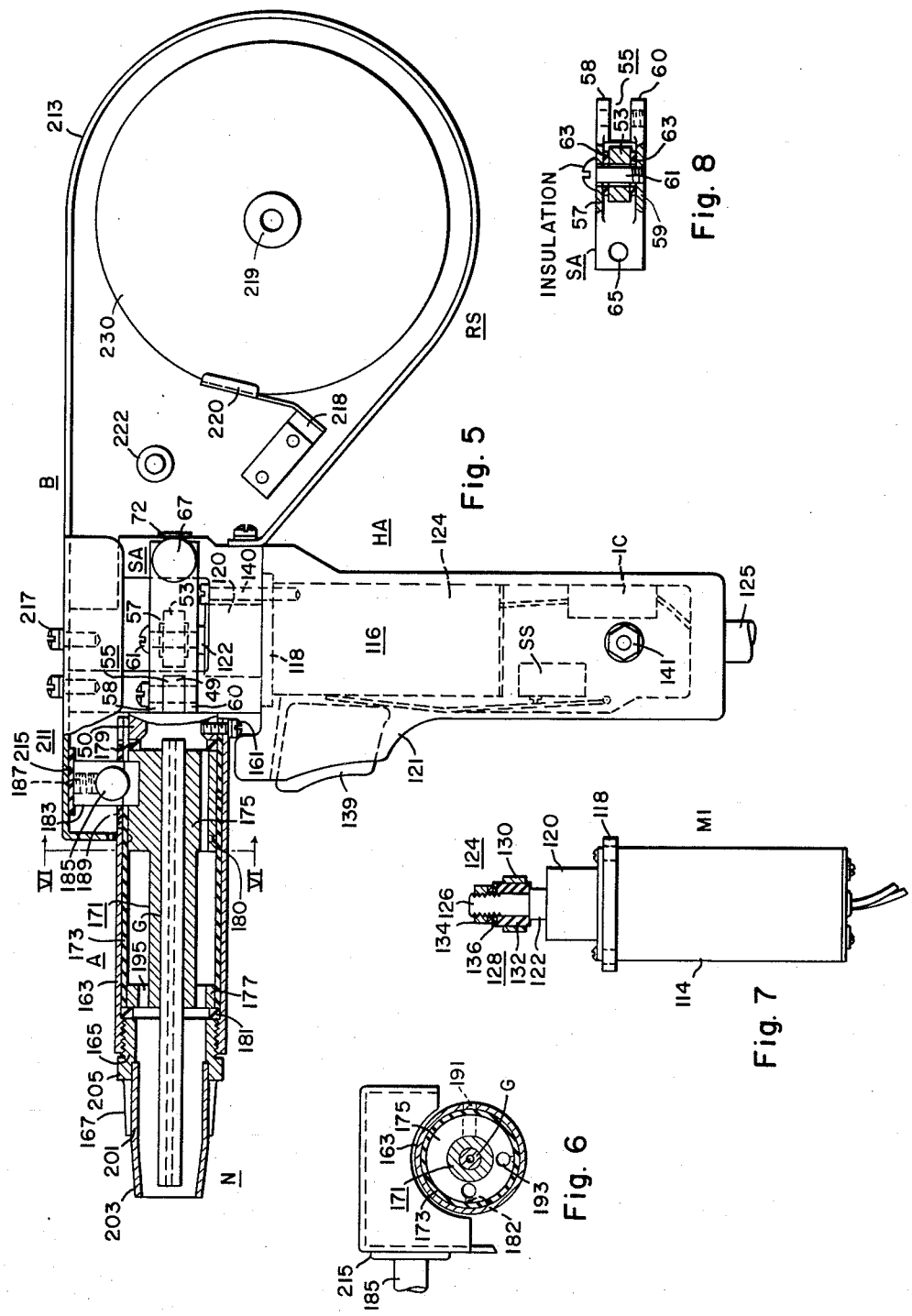

June 11, 1963   F. E. ADAMSON   3,093,728
ARC WELDING GUN

Filed March 17, 1961                                      3 Sheets-Sheet 3

3,093,728
Patented June 11, 1963

3,093,728
ARC WELDING GUN
Floyd E. Adamson, Kenmore, N.Y., assignor to Westinghouse Electric Corporation, East Pittsburgh, Pa., a corporation of Pennsylvania
Filed Mar. 17, 1961, Ser. No. 96,526
11 Claims. (Cl. 219—130)

This invention relates to the arc-welding art and has particular relationship to arc welding guns for welding with a consumable electrode. This invention in its broader aspects also includes features which may be applied to welding with a non-consumable electrode.

In its most specific aspects this invention concerns itself with an arc-welding gun for welding with a consumable electrode derived from a reel mounted integrally with the gun and advanced into welding relationship with the work by a motor on the gun. A gun of this type is disclosed in Patent No. 3,038,990 granted June 12, 1962, to George H. Cotter and Harry J. Bichsel and assigned to Westinghouse Electric Corporation. The Cotter-Bichsel gun has proved highly satisfactory and many thousands of these guns have been sold and are today in successful use in industry both in the United States and abroad. But the demand has arisen for features not incorporated in the Cotter-Bichsel gun and it is an object of this invention to provide an arc welding gun with such additional features.

Among the more important of these features is that no exposed part of the gun shall be electrically "hot" so that the operator may be shocked or so that the gun may be damaged by an arc when it (for example, the nozzle) touches the work; that no portion of the electrode on the reel shall be exposed to drops or drippings or spatter from a weld regardless of the direction in which the electrode is advanced into engagement with the work; and that the nozzle shall be readily removable from the gun and shall be within a limited range adjustable so that the distance between the rim of the nozzle and the end of the electrode guide tube may be set within this range. It is an object of this invention to provide a gun having these features.

The arc-welding gun in accordance with this invention is driven by a knurled or toothed drive roll extending from a drive motor within the handle of the gun. The electrode is held in engagement with the knurled drive roll by an idler roll which is rotatably mounted on a swing arm. During operation the swing arm is pivoted to a position in which the electrode is compressed between the drive roll and the idler roll and is advanced by the drive roll. The electrode is advanced by these rolls through an electrode guide tube which extends into the nozzle. In accordance with this invention, the power for welding is impressed through the electrode guide tube but both the drive roll and the idler roll are insulated from their shafts and supporting parts so that the potential from the electrode is not transmitted through the drive roll and the idler roll to any of the parts to which the rolls are mechanically connected.

In accordance with a further aspect of this invention, the electrode reel which is composed of insulating material is mounted on a reel mount or bracket secured to the body of the gun and the reel mount like the other parts of the body is insulated from the electrode. The bracket carries a shield which completely encloses the reel and prevents drops or drippings from an overhead weld or drops or spatter from a weld of any other type from penetrating to the electrode on the reel.

In accordance with this invention in another of its aspects, the nozzle is readily removable and readily adjustably supported from resilient fingers extending from the end of the gun barrel which forms a part of the gun body and the joint between the nozzle and the finger unit is such as to prevent the flow of gas through the nozzle from causing air from the atmosphere around the weld to be sucked into the shielding gas through the space between the fingers. Specifically, the nozzle in the region where it is engaged by the fingers extends beyond the termination of the fingers into the adapter supporting the fingers. This portion of the nozzle body engages the surface of the adapter snugly preventing the flow of any air through the spaces between the fingers into the shielding gas stream. The length of the portion of the nozzle supported by the fingers is such as to permit the desired adjustment of the distance of the nozzle from the work or from the rim of the electrode guide tube without reducing the blocking region between the nozzle and the adapter to a point at which air is sucked into the shielding stream.

The novel features considered characteristic of this invention are disclosed generally above. In detail, this invention both as to its organization and as to its method of operation together with additional objects and advantages thereof will be understood from the following description of a specific embodiment taken in connection with the accompanying drawings in which:

FIGURE 1 is a view in top elevation of an arc welding gun in accordance with a specific aspect of this invention;

FIG. 2 is a view in front elevation of the main bracket (which in certain gun structures is the main casting) of the gun shown in FIG. 1;

FIG. 3 is a view in top elevation of the main bracket;

FIG. 4 is a view in side elevation of the main bracket;

FIG. 5 is a view partly in side elevation and partly in longitudinal section of the gun shown in FIG. 1;

FIG. 6 is a view taken along line VI—VI of FIG. 5;

FIG. 7 is a view partly in side elevation and partly in section showing the motor and the drive roll of the gun shown in FIG. 1;

FIG. 8 is a view partly in section and partly in side elevation of the swing arm and the idler roll of the gun shown in FIG. 1;

Figure 9:
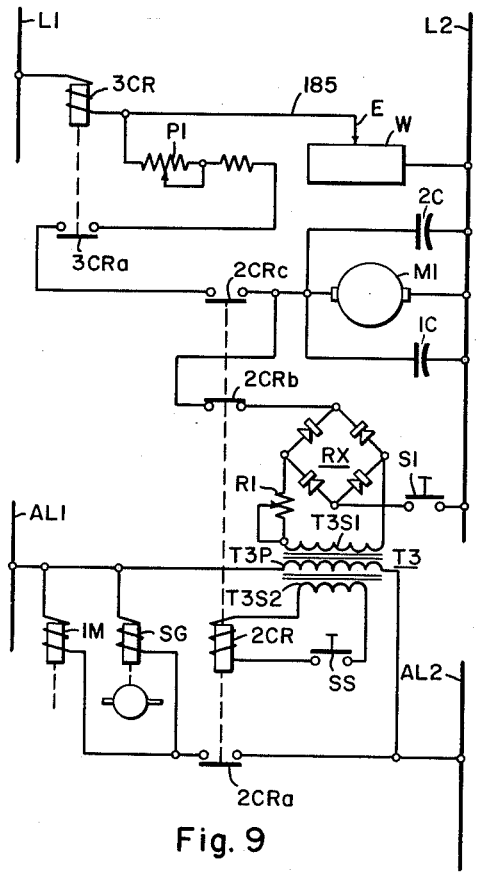
FIG. 9 is a schematic showing a typical circuit for welding with so-called constant current with the gun shown in FIG. 1.

The gun shown in FIGURES 1 through 8 includes a main bracket B. The bracket B is of a suitable metal such as aluminum and has generally the form of a block having a relatively deep generally rectangular opening 31 (FIGS. 3 and 4) in one of its faces. The opening 31 communicates with a cylindrical opening 33 extending along the length of the block parallel to the opening 31. A boss 37 having a threaded opening 39 therein to accommodate a pipe fitting 41 (FIG. 2) extends at an angle of about 45° from the face behind the rectangular opening 31. The fitting 41 is connected to the gas cable through an elbow 43.

A boss 49 of generally semicylindrical form having an opening 51 therein extends from the face adjacent the rectangular opening 31. This boss 49 serves as a hinge-sleeve for the swing arm SA (FIG. 8) which carries the idler roll 53.

The bracket B has a generally cylindrical projection 50 extending from one of the walls which define the opening 31. The opening 39 in the boss 37 communicates with the opening in the projection 50 and thus shielding gas is transmitted to the opening. The projection 50 has lateral tapped holes 52 for securing the sleeves 163 and 173.

The bracket B is provided with openings coaxial with the projection in which bushings 70 and 72 of a material such as nylon offering minimal resistance to the electrode are secured. The electrode passes centrally through the bushings and through the projection into an electrode guide.

The swing arm SA which carries the idler roll 53 is bifurcated at one end 55 and at the bifurcated end engages the boss 49 from the main bracket. The arm SA is pivotally suspended from the boss 49 on a bolt 56 which passes through one of the fingers 58 at the end 55 and the boss 49, and is screwed into the other finger 60. From the center of opposite sides of the arm SA projections 57 and 59 extend. The idler roll 53 is rotatably supported on an insulating pin 61 passing through one propection 57 and screwed into the other 59. The roll 53 is composed of a hard metal such as stainless or tool steel and is insulated from the walls of the arm SA by insulating washers 63. The idler roll 53 is thus entirely out of electrical contact with any part of the arm. At its end opposite to the bifurcated end 55, the swing arm SA is provided with a tapped hole 65 where it may be engaged and held by a thumb screw 67 which may be screwed into the bracket B. When the arm SA is in the closed position, the idler roll 53 extends inwardly into the rectangular opening in the bracket B in a position to engage the welding electrode. The idler roll 53 is urged into firm but resilient engagement with the electrode by a spring 69 which is compressed between the head of the thumb screw 67 and the opposite end of the arm SA.

A small gear motor M1 preferably of the direct-current type having a nominal potential rating of 24 volts, is provided for driving the electrode. The motor casing 114 is cylindrical having a flange 118 at the top. A reduction-gear assembly 120 is mounted above the flange 118. The drive shaft 122 extends from the gear assembly and terminates in a generally oval or flattened end 124, the tip 126 of which is threaded. The drive roll 128 consists of a tire 130 of hard metal such as tool steel molded in an insulating center 132, for example, hard rubber. The outer surface of the tire 130 is knurled or otherwise roughened. The inner surface of the center has an oval cross section to correspond to the oval end 124 on the shaft 122. The roll 128 is thus keyed to the end 124. The roll is held on the end by a nut 134 screwed on the threaded tip 126 separated from the drive roll 128 by an insulating washer 136. The drive roll is thus entirely insulated from the shaft 122.

The handle HA (FIG. 5) is similar to the handle HA of the gun shown in the Cotter-Bichsel application. This handle SA is of insulating material and is of generally cylindrical structure thickened at the top and having a slotted boss 121 extending laterally from one side at the top. The handle HA is hollow but is open at the top and closed at the base except for an opening through which a cable 125 carrying the control conductors extends. The opening at the top is bounded by a recess. The flange 118 of the casing 114 engages the recess in the top of the handle HA and the casing 114 extends into the cavity in the handle. The handle HA is secured to the lower face of the bracket B by bolts 140 extending through the bracket B parallel to the opening 31 and screwed into the periphery of the handle HA. The gear assembly 120 and drive shaft 122 extend through the opening 33 in the bracket B which abuts the upper rim of the handle HA into the generally rectangular opening 31 in the bracket B with the drive roll 128 in a position to advance an electrode through the gun.

Within the cavity of the handle HA the starting switch SS is provided. This switch is actuable by a trigger 139 extending through the slot in boss 121. In addition, an inching switch SI and button 141 and a capacitor 1C are provided in the cavity 131. The capacitor 1C serves the purpose described in application Serial No. 52,842 filed August 30, 1960 to Adamson and Giler and assigned to Westinghouse Electric Corporation.

The gun also includes a barrel A which is secured to the cylindrical projection 50 on the main bracket B by bolts 161. This barrel includes an outer sleeve or shell 163 of a material such as stainless steel which is threaded at the end. An adapter 165 which is externally threaded is screwed into the thread at the end of the sleeve 163. This adapter is of generally hollow cylindrical form terminating in resilient fingers 167 which extend from a shoulder on the adapter 165 and which serve to hold a nozzle N.

The barrel A also includes an electrode guide tube G which is held coaxial with the sleeves 70 and 72 by a generally spool-shaped conductor 171. The barrel A also includes an insulating sleeve 173 between the outer shell or sleeve 163 and the guide holder 171. The guide holder 173 has flanges 175 and 177. The outer surfaces of each of the flanges 175 and 177 are insulated from the shell or outer sleeve of the barrel A by the insulating sleeve 173 and from the projection 50 from the bracket B on one side and the adapter 165 on the opposite side by insulating washers 179 and 181.

Current is conducted to the electrode guide G by a lug 183 soldered to the flange 175 and extending through the insulating sleeve 173 and the outer metal sleeve 163. The power conductor 185 is secured to the lug 183 in conducting engagement by a set screw 187 screwed into the upper portion of the lug. The conductor 185 is an insulated cable and the operator is protected from contact with the conductor. In the region where the lug 183 passes through, the outer sleeve 163 is provided with an opening of generally rectangular form. Within this opening there is a generally rectangular insulator 189 which prevents strands from the conductor 185 from coming into contact with the outer sleeve 163. The flange 175 also has threaded openings for accommodating a set screw 191 which serves to secure the electrode guide tube G to the conductor 171.

The flange 175 is provided with openings 193 (FIG. 6) which constitutes gas channels between the projection 50 from the bracket B and the portion of the electrode guide holder 171 between the flanges 175 and 177. Because of the presence of the lug 183 and the set screw 191, these openings cannot be generally symmetrically disposed about the axis of the holder 171. Thus, any gas which flows into the space between the flanges 175 and 177 does not enter symmetrically. The flange 177 has longitudinal openings 195 which are symmetrically disposed. It has been found that in spite of the dissymmetry of the entrance opening 191 through the flange 175, the gas which is emitted through the symmetric openings 195 has generally circular symmetry about the axis of the guide tube. The flange 175 also has a circumferential groove 180, (FIG. 5). This groove 180 is connected to openings 193 through tubular openings 182 (FIG. 6). A part of the gas which flows through openings 193 is bled through openings 182 and groove 180 into the space between flange 175 and sleeve 173 and prevents the aspiration of air into the shielding gas stream.

The nozzle N includes a generally cylindrical stem 201 from which an internally and externally tapered outlet portion 203 extends. The tapering is such as to reduce the nozzle opening at the gas emitting end. The cylindrical portion 201 of the nozzle is so dimensioned that it is capable of being engaged and firmly held by the fingers 167 of the adapter 165. The length of the cylindrical portion 201 is such that the cylindrical portion extends well beyond the shoulder 205 of the adapter and closely hugs the internal wall of the adapter beyond the shoulder. The aspiration of air through the space 207 between the resilient fingers 167 of the adapter 165 into the shielding gas is suppressed by the joint between the adapter 165 and the cylindrical portion 201 of the nozzle N. The nozzle N may be moved longitudinally inwardly or outwardly for adjustment purposes. The region of engagement of the cylindrical portion 201 of nozzle N and the portion of the adapter 165 behind the shoulder 205 should be sufficiently long to block the flow of air into the shielding gas through the space 207 between the fingers in the most outward position of the nozzle N.

The electrode guide tube G is a tubular conductor of copper or other highly conducting material. Power is supplied to the electrode through the guide tube G by contact between the electrode as it moves through the guide tube and the inner wall of the guide tube G. It has been found that instantaneous interruptions of the arc may occur during short time intervals when the electrode becomes entirely disconnected from the guide tube. To prevent such interruptions it is advisable to kink or otherwise provide a bend in the guide tube G at the electrode exit end. The electrode then contacts the guide tube at all times.

The gun includes an electrode reel support RS which is in the form of a pan having the form of a circular arc from which a handle portion 211 extends. A rim 213 extends at right angles from the circular portion. The handle portion 211 extends over the top of the bracket B and the portion of the barrel A through which the lug 183 is secured like a box. The power supply cable 185 passes through an insulating grommet 215 in the portion of the handle 211 extending over the barrel A. The reel support RS is secured to the bracket B by bolts 217 which engage the handle portion 211. The reel 230 is mounted on a spindle 219 secured by a bolt 221 to the center of the arc of the pan portion.

The reel support RS has a brake for the reel. This includes a bracket 218 secured to the base of the pan portion from which a resilient arm 220 having a lip on one side extends. This arm 220 engages the outer rims of the flanges of the reel 219 producing a braking effect.

The reel support is also provided with an idler roller 222 about which the electrode is threaded before it passes into the insulating sleeve 72 adjacent the support RS.

A shield 223 of transparent insulating material for example, lucite, is mounted so that it completely encloses the pan-shaped portion of the reel support RS. The rim of this shield 223 engages the projecting rim 213 and the bracket B. The shield is secured to the spindle at the end remote from the bolt 221.

The gun according to this invention may be used either in producing a weld with a so-called constant current supply or with a so-called constant voltage supply. The schematic shown in FIG. 9 covers the constant current operation and that shown in FIG. 10 covers the constant voltage operation.

In constant current operation, the armature of the motor M1 is connected across the arc between the electrode E and the work W and response to the arc voltage which varies as the welding proceeds. In constant current operation, the motor M1 is supplied independently of the arc. Analogous circuits which may be used with the gun disclosed herein are shown in the above identified Cotter-Bichsel patent and Adamson-Giler applications.

Figure 10:
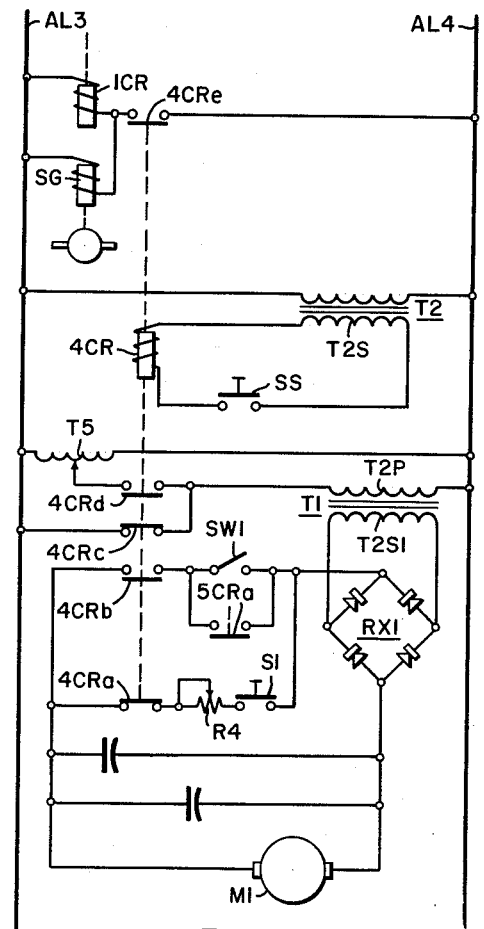
FIG. 10 is a like circuit for welding at substantially constant potential with the gun shown in FIG. 1.

In the apparatus shown in FIG. 9, the welding power is derived from conductors L1 and L2 which may be the output busses of a welding power supply, for example, a rectifier welder. The control potential is supplied from conductors AL1 and AL2 which may derive their power from the supply energizing conductors L1 and L2 through suitable transformers.

This apparatus includes a transformer T3, a relay 2CR, and current relay 3CR. This apparatus also includes a contactor 1M which when actuated closes the energizing circuit for the conductors L1 and L2 and a solenoid SG for controlling the supply of gas to the gun. The transformer T3 has a primary T3P and a pair of secondaries T3S1 and T3S2. The relay 2CR has a back contact 2CR$b$ and front contacts 3CR$a$ and 2CR$c$. The current relay has a front contact 3CR$a$.

In addition to the capacitor 1C, which has a capacity of about .05 microfarad the apparatus includes a large capacitor 2C. Both 1C and 2C are connected across the armature of the motor M1. The large capacitor 2C is usually physically disposed in the central cabinet which may be as far as 50 feet or more from the gun. The purposes of the capacitors 2C as well as 1C are disclosed in the Adamson-Giler application.

The coil of 2CR is connected to be supplied through the secondary T3S2 when the switch SS is closed by the trigger on the gun. The coil of contactor 1M and solenoid SG are adapted to be connected between conductors AL1 and AL2 through the contact 2CR$a$ when the relay 2CR is actuated. Power is supplied to the motor M1 for inching purposes from the secondary T3S1 through a rectifier RX and through the back contact 2CR$b$ when the inching switch SI on the gun is actuated.

The welding electrode E is connected to the power supply conductor L1 through the coil of the current relay. The work W is directly connected to the conductor L2 which may be grounded. During welding the motor M1 is energized in accordance with the potential between the electrode and the work in a circuit extending from the electrode through a variable resistor P1, a fixed resistor R2, the front contact 3CR$a$ and the front contact 3CR$c$.

In the operation of the apparatus at constant current, the electrode E is first threaded from the reel 230 through the gun. For this purpose, the swing arm SA is set in the open position and the electrode after being threaded over the idler roller 222 is thrust into the insulating sleeve 72 adjacent the reel 217, passed over the drive roll 128 and thrust into the sleeve 70.

The swing arm SA may then be set in the closed position and the thumb screw 67 tightened so that the electrode E is held firmly between the drive roll 128 and the idler roll 53. The inch button SI may then be repeatedly actuated energizing the motor M1 and advancing the electrode through the guide G.

When the electrode E extends the proper distance from the guide G, the trigger 139 is closed and the gun is placed with the electrode in contact with the work W. The relay 2CR is then actuated energizing the gas solenoid so that shielding gas flows through the nozzle N and the contactor 1M is actuated so that the conductors L1 and L2 are energized. The work W may then be scratched by the electrode E to fire the arc. The arc current then flows between the electrode and the work and the relay 3CR is actuated closing contact 3CR$a$. Since at this point contact 2CR$c$ is also closed the motor M1 is energized feeding the electrode into the arc.

The shielding gas flows from the gas conductor through the interior portion of the projection 50 on the bracket B, the channel 193 in the flange 175 of the electrode guide holder 171, the space between the flanges 175 and 177, and the symmetric channels 195 within the flange 177 and then through the nozzle N. The flow is laminar. There is a reservoir of gas under pressure in the region between the interior of the projection 50 from the bracket B, the adjacent flange 175 on the electrode guide holder 171 and the adjacent insulating washer 179. This pressure causes gas to flow through the small openings 182 into the groove 180 and then into the space between the insulating sleeve 173 and the flange 175 and prevents the seepage of air through the sleeves into the gas stream. The overlapping portion of the nozzle N prevents gas from being sucked in through the spaces between the resilient fingers 167. It has been found that the welds produced with this gun are highly satisfactory and are free of blow-holes and other porosity.

For welding with constant voltage the control apparatus is energized from the control conductors AL3 and AL4. This apparatus includes a relay 1CR which when actuated energizes the power supply for welding (not shown). This apparatus also includes the relay 4CR and the current relay 5CR the coil (not shown) which is energized by the flow of welding current. The relay 4CR has two back contacts 4CR*a* and 4CR*c* and three front contacts 4CR*b*, 4CR*d* and 4CR*e*. This apparatus also includes transformers T1 and T2.

The motor M is supplied from the secondary T2S1 of transformer T1 through rectifier RX1 both during inching and during welding. During inching the motor M1 is connected in a circuit including RX1, the motor armature, back contact 4CR*a*, adjusting resistor R4 and the inching switch SI. During welding the motor M1 is connected in a circuit extending from RX1 through the motor armature, the front contact 4CR*b* and the front contact 5CR*a*. During inching the primary T2P of transformer T1 is supplied directly from the conductors AL3 and AL4 through the front contact 4CR*c*. Thus, this inching potential is constant. During welding the primary T2P is supplied from conductors AL3 and AL4 through variable transformer T5 and the front contacts 4CR*c*. Thus, the speed of the motor M1 is adjustable during welding.

During welding the gas solenoid SG and the coil of the relay 1CR which energizes the power supply are both supplied from conductors AL3 and AL4 through front contact 4CR*e*.

The operation is in general similar to that at constant current. The electrode E is threaded through the gun by the operation of the inching switch SI. To start a welding operation, the gun is placed near the work and the trigger switch SS is closed actuating 4CR. The gas solenoid is then energized causing gas to flow to the work and the relay 1CR is actuated causing the power supply for the arc to be energized. The electrode may then be touched to the work. The tip of the electrode is then melted and in effect exploded producing the arc. Contact 5CR*a* then closes energizing the motor M1 and causing the electrode to flow into the arc.

In certain situations the contact 5CR*a* may be shorted by switch SW1. The electrode is then advanced towards the work automatically to fire the arc.

While a preferred embodiment of this invention has been disclosed herein many modifications thereof are feasible. This invention then should not be restricted except insofar as is necessitated by the spirit of the prior art.

I claim as my invention:

1. A gun for arc welding work in a shield of gas comprising a gun body from which a barrel extends, said barrel terminating in resilient fingers, and a gas nozzle readily removably and adjustably secured by said fingers, said nozzle extending internally into said barrel in a direction upstream with respect to said gas so as to expand outwardly with respect to said barrel when heated by said arc, said nozzle extending a substantial distance beyond the region on said barrel from which said fingers extend and hugging the contiguous internal surface of said barrel closely, so as to suppress the flow of air into said gas stream through the spaces between said fingers.

2. A gun for arc welding work with a consumable electrode in a shield of gas comprising a gun body from which a barrel and a gas nozzle extend, an electrode guide supported within said barrel and terminating in said nozzle, means connected to said body for rotatably supporting a reel having an electrode wound thereon, and drive means supported on said body to be engaged with said electrode for transmitting said electrode through said guide into welding relationship with said work, said drive means being insulated from said body, and, power-supply conducting means insulated from said body and passing through said barrel insulated from the outer surface thereof and connected to said guide within said barrel for impressing welding potential on said electrode.

3. A gun for arc welding work with a consumable electrode in a shield of gas comprising a gun body from which a barrel and a gas nozzle extend, an electrode guide supported within said barrel and terminating in said nozzle, means connected to said body for rotatably supporting a reel having an electrode wound thereon, and drive means supported on said body to be engaged with said electrode for transmitting said electrode through said guide into welding relationship with said work, power-supply conducting means insulated from said body passing through said barrel and insulated from the outer surface of said barrel and connected to said guide for impressing welding potential on said electrode, and a shield connected to said supporting means completely enclosing said electrode and reel for completely protecting said electrode on said reel from drops ejected from said electrode or work near said arc during a welding operation.

4. A gun for arc welding work with a consumable electrode in a shield of gas including a gun body from which a barrel extends, said barrel having a conductor outer casing, a guide for said electrode, a generally cylindrical conductor centrally within said barrel centrally supporting said guide, said conductor being perforated to transmit said shielding gas through said barrel, electrical insulating means between said conductor and said casing, power-supply conducting means passing through said casing and directly connected to said conductor and insulated from said casing for supplying electrical power to said electrode and means connected to said body and in communication with the perforations in said barrel for supplying shielding gas through said barrel.

5. A gun for arc welding work with a consumable electrode in a shield of gas including a gun body from which a barrel extends, said barrel having a conducting outer casing, a guide for said electrode, a generally cylindrical conductor centrally within said barrel centrally supporting said guide, said conductor having flanges which are displaced along said barrel, electrical insulating means between said conductor and said casing, power-supply conducting means connected to the one of said flanges which is upstream with reference to the flow of said gas and passing through and insulated from said casing for supplying electrical power to said electrode and means connected to said body for supplying shielding gas through said barrel, said gas being supplied through channel means in said flanges, communicating with the space between said flanges, said channel means in said one flange being unsymmetrical with respect to the longitudinal axis of said conductor and said channel means in the other flange being symmetrical with respect to said axis.

6. A gun for arc welding work in a shield of gas comprising a gun body from which a barrel extends, said barrel terminating in resilient fingers, and a gas nozzle having a portion extending upstream of said gas into said barrel in engagement with said fingers to be readily removably secured by said fingers, said portion of said nozzle and the portion of said barrel upstream from said fingers overlapping so as to suppress the flow of air into said gas stream through the spaces between said fingers.

7. A gun for arc welding work in a shield of gas comprising a gun body from which a barrel extends, said barrel terminating in resilient fingers, and a gas nozzle having a portion extending upstream of said gas into said barrel in engagement with said fingers to be readily removably and adjustably secured by said fingers, said portion of said nozzle and the portion of said barrel adjacent said fingers upstream from said fingers overlapping so as to suppress the flow of air into said gas stream through the spaces between said fingers in all positions of said nozzle.

8. A gun for arc-welding work in a shield of gas with a consumable electrode comprising a gun body from which a barrel extends, said barrel terminating in resilient fingers, a gas nozzle readily removably and adjustably secured by said fingers, said nozzle extending internally into said barrel in a direction upstream with respect to said gas so as to expand outwardly with respect to said barrel when heated by said arc, said nozzle extending a substantial distance beyond the region on said barrel from which said fingers extend, and the surface of said nozzle extending internally hugging the contiguous internal surface of said barrel closely, said hugging surfaces suppressing the flow of air into said gas stream through the spaces between said fingers, and a guide for said consumable electrode supported in said body and extending through said barrel for transmitting said electrode into arc-welding relationship with said work.

9. A gun for arc-welding work in a shield of gas with a consumable electrode comprising a gun body from which a barrel extends, said barrel terminating in resilient fingers, a gas nozzle having a portion extending upstream of said gas into said barrel in engagement with said fingers to be readily removably secured by said fingers, said portion of said nozzle and the portion of said barrel adjacent said fingers upstream from said fingers overlapping so as to suppress the flow of air into said gas stream through the spaces between said fingers, and a guide for said consumable electrode supported in said body and extending through said barrel for transmitting said electrode into arc-welding relationship with said work.

10. A gun for arc-welding work in a shield of gas with a consumable electrode comprising a gun body from which a barrel extends, said barrel terminating in resilient fingers, a gas nozzle having a portion extending upstream of said gas into said barrel in engagement with said fingers to be readily removably and adjustably secured by said fingers, said portion of said nozzle and the portion of said barrel adjacent said fingers and upstream from said fingers overlapping so as to suppress the flow of air into said gas stream through the spaces between said fingers in all positions of said nozzle, and a guide for said consumable electrode supported in said body and extending through said barrel for transmitting said electrode into arc-welding relationship with said work.

11. A gun for arc-welding work in a shield of gas with a consumable electrode comprising a gun body from which a barrel member extends, a gas nozzle member, said nozzle member extending into said barrel member so as to expand outwardly with respect to said barrel member when said nozzle member is heated by said arc, said nozzle member being readily removably and adjustably secured to the end of said barrel member remote from said body by a resilient finger joint including resilient fingers extending from one of said members and engaging the other member, the junction between said nozzle and barrel members including a region beyond said fingers of substantial length in which said nozzle and barrel members overlap, the overlapping surfaces of said members hugging each other so as to suppress the aspiration of air into the gas stream in the nozzle member through the spaces between said fingers, and a guide for said consumable electrode supported in said body and extending through said barrel member for transmitting said electrode into arc-welding relationship with said work.

References Cited in the file of this patent

UNITED STATES PATENTS

| 2,444,767 | Cobean | July 6, 1948 |
| 2,735,920 | Valliere | Feb. 21, 1956 |
| 3,038,990 | Cotter et al. | June 12, 1962 |

FOREIGN PATENTS

| 816,632 | Great Britain | July 15, 1959 |

OTHER REFERENCES

"New West. Ing. Gun," Welding Journal, April 1958, pp. 444–445.